United States Patent [19]

Willis et al.

[11] Patent Number: 5,169,443
[45] Date of Patent: Dec. 8, 1992

[54] PAPER COATING KAOLIN PIGMENTS THERE PREPARATION AND USE

[75] Inventors: Mitchell J. Willis, Macon, Ga.; Patrick D. Canavan, Brooklyn, N.Y.

[73] Assignee: Engelhard Corporation, Iselin, N.J.

[21] Appl. No.: 791,821

[22] Filed: Nov. 13, 1991

[51] Int. Cl.$^5$ .......................... C09C 1/28; C09C 3/06
[52] U.S. Cl. ..................... 106/486; 106/416; 501/144; 501/145; 501/146; 162/181.8; 428/144; 428/153; 428/537.5
[58] Field of Search ........................ 501/144, 145, 146; 106/416, 486; 162/184, 181.7, 181.8; 428/537.5, 688, 153, 211, 144

[56] References Cited

U.S. PATENT DOCUMENTS

| | | | |
|---|---|---|---|
| 3,343,973 | 9/1967 | Billue | 106/486 |
| 3,394,022 | 7/1968 | Lyons et al. | 501/145 |
| 3,615,806 | 10/1971 | Torock et al. | 106/416 |
| 3,798,044 | 3/1974 | Whitley et al. | 501/145 |
| 4,381,948 | 5/1983 | McConnell et al. | 106/416 |
| 4,578,118 | 3/1986 | Heuge et al. | 106/486 |
| 4,820,554 | 4/1989 | Jones et al. | 501/146 |
| 4,851,048 | 7/1989 | Jones et al. | 501/146 |
| 4,888,315 | 12/1989 | Bowman et al. | 501/144 |
| 4,916,094 | 4/1990 | Salinas | 501/146 |
| 4,943,324 | 7/1990 | Bundy et al. | 106/416 |
| 5,011,534 | 4/1991 | Berube et al. | 106/416 |

FOREIGN PATENT DOCUMENTS 0889654  2/1962  United Kingdom ................ 501/145

OTHER PUBLICATIONS

"Pigments for Paper, Clay", Murray, H. H., Tappi Press.
"World Kaolins-Genesis, exploitation, and application", Bristow, C. M., Industrial Minerals, Jul. 1987.
"Kaolin: processing, properties and applications", Prasad, M. S., Reid, K. J., and Murray, H. H., Applied Clay Science 6 (1991) 87-119.
"Kaolin in paper filling and coating", Bundy, W. M., Ishley, J. N., Applied Clay Science 5 (1991) 397-420.

*Primary Examiner*—William R. Dixon, Jr.
*Assistant Examiner*—Paul Marcantoni

[57] ABSTRACT

Paper coating pigments comprising mechanically delaminated kaolin particles. The pigments possess the opacification, smoothness and printability advantages of conventional delaminated kaolin pigments but have desirably low viscosity and gloss not characteristic of conventional delaminated kaolin pigments.

4 Claims, No Drawings

PAPER COATING KAOLIN PIGMENTS THERE PREPARATION AND USE

This invention relates to novel mechanically delaminated kaolin clay pigments especially useful for coating lightweight printed paper. In particular, the invention relates to delaminated kaolin coating pigments which possess a unique combination of desirable properties not possessed by other kaolin pigments.

Kaolin clay piqments are obtained from kaolin crudes. The crudes contain kaolin particles, oversize (grit) and fine and coarse particle size impurities. Some of impurities (e.g., fine ferruginous or titaniferous impurities) impart undesirable color to the clay. Other impurities have an undesirable effect on the rheology of the kaolin.

The kaolin portion of kaolin crudes is "polydisperse" in the sense that the particles occur over a range of sizes and shapes. Thus, a kaolin crude will not contain particles of a single size, such as, for example, particles all of which are 2 micrometers. Typically a degritted kaolin crude will contain particles ranging in size from submicron or colloidal to particles 20 micrometers or larger.

Kaolins from different ores, or even from different zones in the same deposit, can vary widely in the content of impurities, particle size distribution as well as the morphology of the kaolin particles. In general, kaolin particles finer than about 2 micrometers are composed of individual platelets, and particles larger than above 2 micrometers are composed of stacks or booklets of finer particles. Particle sizes of kaolins are conventionally determined by sedimentation using Stokes law to convert settling rates to particle size distribution, and assume a spherical particle shape for the kaolin particles. Hence, the use of the conventional term "equivalent spherical diameters (e.s.d.)" to designate particle size.

Kaolin clay pigments are widely used to coat and to fill paper products and they are also used as functional fillers in paints and plastics. Such pigments are available in a large number grades, the selection of which by the user is determined by price and performance. It was formerly the practice to simply use relatively coarse kaolins to fill papers and to employ finer grades of kaolin to coat paper. In paper the coarser kaolin fillers functioned primarily as pulp extenders. When used to coat paper, the finer kaolin pigments improved opacity of the paper, provided a smooth, ink-receptive surface and gloss which improved print quality and aesthetic appearance.

It has long been recognized in the industrial minerals industry that mechanical delamination of kaolin stacks present in the coarse particle size fractions of many kaolin crudes provide kaolin pigments with improved opacification as well as enhanced smoothness in paper coating. See, for example U.S. Pat. No. 3,171,718, Gunn et al.

During mechanical delamination, large kaolin particles are disaggregated into smaller particles having a higher aspect ratio, principally by parting clay crystals along basal cleavages. It has also been recognized that a relative narrowing of the particle size distribution of mechanically delaminated as well as nonelaminated kaolin particles results in pigments providing improved opacity and smoothness to paper along with improved printability. Such pigments are disclosed as being especially advantageous when used in the manufacture of light weight coated paper for rotogravure printing (see GB 2,058,734). The characteristics of delaminated pigments are particularly beneficial in the coating of groundwood—containing paper basestock, which is typically of substantially lower uncoated sheet brightness and of rougher surface than chemical wood-free basestock.

Delaminated pigments in clay-water slurries and in paper coating color formulations, however, have substantially poorer high shear rheological characteristics (higher viscosity) than undelaminated pigments. Superior rheology in coating color formulations permits the paper coating equipment to run at higher speeds, which directly increases the productivity of existing coating equipment, or it permits the formulation of coating colors at higher solids, thereby reducing drying time and hence increasing the efficiency of drying equipment. Thus, with the use of conventional delaminated pigments, papermakers must balance the tradeoff between paper opacification (quality) and efficiency of production (productivity).

Coating color viscosity is a key issue with paper coaters facing capacity constraints. A clay-water slurry that has equivalent viscosity to a comparable slurry at only 2–3% higher pigment solids represents an improvement of significant commercial importance.

Generally, paper makers seek to use clay coating pigments capable of forming clay-water slurries at 67–70% solids which have a low shear viscosity below 1000 cp, preferably below 500 cp, when measured by the Brookfield Viscometer at 20 rpm. High shear viscosity for these slurries should be such that they are no more viscous than a slurry having a Hercules endpoint viscosity at $16 \times 10^5$ dyne-cm of 500 rpm, preferably 800 rpm, using the "A" bob. Those skilled in the art are aware that when using the Hercules Viscometer and measuring endpoints of 1100 rpm or higher, viscosity is reported in units of dyne-cm at 1100 rpm. It is conventional to use the abbreviated term "dyne". A "2 dyne" clay slurry is less viscous than a "9 dyne clay" slurry at a given solids level.

Kaolin pigments produced by mechanical delamination are currently commercially made and marketed as delaminated pigments by various producers with processing facilities located in Georgia and South Carolina, using as raw material sources the Cretaceous and Tertiary kaolin deposits of the region. However, none of the commercially available delaminated kaolin pigments have the unique desirable combination of high opacification and the low viscosity characteristic of some undelaminated pigments.

SUMMARY OF THE INVENTION

An object of the invention is to provide kaolin pigments which possess the opacification, smoothness, and printability advantages of a delaminated kaolin pigment with narrow particle size distribution and with exceptional high and low shear viscosity that provide papermakers with productivity enhancements.

This invention stems from our discovery that certain kaolin crudes, such as those available in the Rio Capim area of Para, Brazil and Manaus, Amazonas, Brazil are capable of providing delaminated kaolin pigments having both desirable low viscosity not normally associated with delaminated pigments, desirable optical properties of opacification normally associated with coarse particle size delaminated kaolin pigments, and desirable optical properties of gloss not normally associated with delaminated pigments. It is not known why the delaminated pigments of the invention are remarkably superior to known delaminated and undelaminated kaolin pigments.

Accordingly, the present invention provides novel kaolin pigments comprising kaolin particles which have been subjected to the process of mechanical delamination. Pigments of the invention possess the following distinguishing combination of properties or characteristics:

Particle Size (weight percent finer than stated equivalent spherical diameter, e.s.d., as measured by Sedigraph)
At least 95% finer than 10 micrometers
37% or less finer than 0.5 micrometers
12% or less finer than 0.2 micrometers
Median particle size: at least 0.70 micrometers
The ratio of $$\frac{\% \text{ finer than 2.0 microns}}{\% \text{ finer than 0.5 microns}} > 2.0$$

Surface Area of 12.5 m$^2$/gm or less (BET method using N$_2$ as adsorbate)
Viscosity
Brookfield viscosity, measured at 20 rpm [#2 spindle] and 67–68% solids: 175 cp or less
and, most preferably, Brookfield viscosity, measured at 20 rpm [#2 spindle] and at 100 rpm [#2 spindle] at 72% solids: 300 cp or less
Hercules viscosity, measured at 1100 rpm [A-bob] and 67–68% solids: dyne endpoint
Opacity and gloss (as measured by black glass)
scatter coefficient at 457 nm: >100.0 m$^2$/Kg
scatter coefficient at 577 nm: >80.0 m$^2$/Kg
gloss: at least 75%

Other aspects of the invention comprise aqueous paper coating compositions containing the pigment of the invention and an organic binder and paper webs coated with kaolin pigments of the invention.

While unique delaminated kaolin pigments have been produced from Rio Capim and Manaus crudes but not from presently known Georgia or other kaolin crudes, it is within the scope of the invention to utilize crudes other than those from Rio Capim and Manaus provided the delaminated products possess the spectrum of properties set forth above.

DESCRIPTION OF PREFERRED EMBODIMENTS

A typical commercially available delaminated pigment from a Georgia producer will have the following characteristics:

| | | |
|---|---|---|
| Particle Size Distribution (weight % finer than e.s.d.) | 79% finer than | 2 micrometers |
| | 63% finer than | 1 micrometers |
| | 43% finer than | 0.5 micrometers |
| | 16% finer than | 0.2 micrometers |

Ratio $\frac{\% \text{ finer than 2.0 micrometers}}{\% \text{ finer than 0.5 micrometers}} < 2.0$

| | |
|---|---|
| Median Particle Size: less than 0.65 micrometers | |
| Surface Area | 15.0 m$^2$/g |
| Viscosity | |
| Brookfield | 275 cp @ 20 rpm @ 68% solids |
| | >300 cp @ 20 rpm @ 68–69% solids |
| Hercules endpoint: | 600 rpm @ 68% solids |
| Black glass: | |
| scatter coefficient | 100 m$^2$/Kg |
| at 457 nm: | |
| scatter coefficient at 577 nm: | 75 m$^2$/Kg |
| gloss: 68% | |

Some commercially available kaolin pigments marketed as delaminated pigments will exhibit better viscosity than is indicated above. These pigments may have dyneendpoint high shear viscosity at 68% solids. However, these particular pigments will be finer than the products of the invention and the above typical delaminated pigment, as measured by a higher surface area and the higher weight percentage of kaolin particles finer than the 0.5 micrometers and 0.2 micrometers control points. While the presence of fine kaolin particles improves the high shear viscosity of delaminated kaolin pigments, the presence of fines concomitantly reduces the scattering efficiency and opacification of the pigments, as quantified by a reduction in the black glass scatter coefficients of the "good" viscosity pigment below those values for products of the invention. For example, the "best" viscosity, commercially available delaminated pigment tested had the following characteristics:

| | |
|---|---|
| Particle Size (weight % finer than e.s.d.) | 98% finer than 5.0 micrometers |
| | 81% finer than 2.0 micrometers |
| | 67% finer than 1.0 micrometers |
| | 50% finer than 0.5 micrometers |
| | 21% finer than 0.2 micrometers |
| Median Particle Size | 0.50 micrometers |

Ratio: $\frac{\% \text{ finer than 2.0 micrometers}}{\% \text{ finer than 0.5 micrometers}} = 1.6$

| | |
|---|---|
| Surface Area | 16.9 m$^2$/g |
| Viscosity | |
| Hercules viscosity, measured at 1100 rpm (A bob) and 68% solids: | 15.9 dyne |
| Brookfield viscosity, measured at 20 rpm (#2 spindle) and 68% solids: | 290 cp |
| Black Glass | |
| Scattering coefficient at 457 nm: | 67 m$^2$/kg |
| Scattering coefficient at 577 nm: | 43 m$^2$/kg |
| gloss 71% | |

Surface Area 16.9 m$^2$/g
Viscosity
Hercules viscosity, measured at 1100 rpm (A bob) and 68% solids: 15.9 dyne
Brookfield viscosity, measured at 20 rpm (#2 spindle) and 68% solids: 290 cp
Black Glass
Scattering coefficient at 457 nm: 67 m$^2$/kg
Scattering coefficient at 577 nm: 43 m$^2$/kg
gloss 71%

While the good high shear viscosity characteristics of this commercially available pigment, marketed as a delaminated pigment, will be perceived as advantageous, the comparatively low black glass scatter coefficients will be perceived by the papermakers as a reduction in paper and print quality, particularly in lightweight papers.

Products of the invention possessing the characteristics set forth in the accompanying claims have been made by various techniques, all involving the step of mechanically delaminated of kaolin crudes or fractions of crudes located in the Rio Capim river basin, Para State, Brazil. The Rio Capim kaolins are contained within an extensive sedimentary formation containing coarse and fine sands, clays and silts. The near-surface clay bearing members have been preserved from erosion in plateau tops. The clay members appear to be stratigraphically flat-lying, with high brightness kaolin horizons occurring underneath variously superficial laterites, sands, and discolored kaolins not suitable for processing. Underneath this waste material, typically there is an horizon of high brightness, low sand content kaolin which is an acceptable source material for products of the invention. In the northern portions of the Rio Capim kaolin district, in the vicinity of Igarape Cipoteua, the crudes can be described as coarse, with the −325 mesh [U.S. sieve] fraction typically having a cumulative particle size distribution of:

| Weight percent finer than | Range | Average |
|---|---|---|
| 2.0 micrometers | 72–39% | 58% |
| 1.0 micrometers | 55–25% | 40% |
| 0.5 micrometers | 34–8% | 20% |
| 0.2 micrometers | 13–1% | 6% |

Further to the south, in the vicinity of Igarape Cupijo, the −325 mesh fraction of the crude kaolin is typically finer, averaging 75% finer than two micrometers and 60% finer than one micrometer.

Those skilled in the art know that the use of sedimentation to determine particle size of the thin platelets of mechanically delaminated kaolins results in values that do not truly reflect the size of thin flat plates. Inspection of micrographs (SEM) of the degritted −325 mesh crudes used in the practice of this invention indicate that, numerically, most of the discrete kaolin particles consist of crystals having 1 to 2 micrometers face diameter and less than .5 micrometers edge thickness. Those skilled in the art refer to particles of this size and crystal form as platelets. Typically the platelets in a suitable crude will have at least one well-formed straight edge, and occasional crystals will have six well-formed edges in a pseudohexagonal crystal habit. The coarseness of kaolin particle population is imparted by the kaolin crystals referred by those skilled in the art as books and large plates. Books are stacks of kaolinite layers. In well-formed crystals the perfect, regular basal cleavage of kaolinite with straight edges at 60 degree angles are readily apparent. Typically the books in crudes used in practice of the invention can be described as roughly equant, on the order of 15 micrometers by 15 micrometers in size. Occasionally, books will develop the vermiform habit wherein the dimension perpendicular to the basal cleavage will be upwards of 40 micrometers in length, often curving at one end of the crystal. Another crystal habit is known as the plate wherein the face diameter is 10 to 15 micrometers and the thickness (the direction perpendicular to the basal cleavage) is on the order of 0.5 micrometers. Plates typically will have less well-formed edges than books.

In the Rio Capim, the degritted kaolin crudes from the "coarser" northern portion of the area appear to have a greater proportion of books and plates relative to platelets than in the "finer" southern area.

Typically the crude is initially crushed and then blunged in water, preferably containing a clay dispersant, such as, for example, a mixture of soda ash and sodium silicate, or a condensed phosphate salt, e.g., tetrasodium pyrophosphate or sodium polyacrylate. Generally, solids of the blunged clay are in the range of 30% to 65%, usually about 40% by weight. The blunged clay is then degritted by known means such as the use of screens or gravity settling to remove oversize (grit). Suitable for this purpose are 200 or 325 mesh (U.S. Standard) screens.

In an embodiment of the invention, the degritted slip of kaolin is then separated into one or more coarse and fine size fractions, the finer fraction being, for example, 70 to 90% by weight finer than 2 micrometers. Continuous centrifuges such as those equipped with nozzle bowls or scrolls can be used or gravity settling can be employed for fractionation. Excellent results were obtained with the crude used in an illustrative example by operating the centrifuge to remove and then isolate a fine size fraction of which about 90% by weight of the particles were finer than 2 micrometers and a coarse fraction which was about 25% by weight finer than 2 micrometers. The coarse size fraction remaining after centrifugation to separate the fines is employed as delaminator feed optionally along with a portion of the fines separated during centrifugation and/or a portion of degritted feed. When a fine fraction is separated in the first classification step, the population of particles comprising the delaminator feed consists of a higher proportion of large kaolin books and plates than occurs in population of kaolin particles contained within the kaolin slip prior to classification. Fines and/or feed are included in delaminated feed primarily to control the particle size distribution of the mechanically delaminated product. See Example 2.

In another embodiment of the invention, the degritted slip is subjected to delamination without an intervening particle size classification. This operation is referred to as "whole fraction delamination". See Example 1 and Example 3.

It is a feature of this invention to terminate the delamination when delamination is essentially complete and attrition of finer than 5 micron platelets begins to occur. The onset of undesired attrition may be controlled by determining the increase in the particle size fraction finer than a particular e.s.d. (e.g., 5.0 and 2.0 micrometers). Duration and intensity of delamination varies, depending on the source of crude, the blend of coarse and fine particle fractions in the delaminator feed, and the desired particle size distribution of the product.

The process of delaminating the clay can be practiced using fine milling media in a batch operation but is advantageously carried out in a continuous manner. Non-limiting examples of milling media are small ceramic balls, coarse sand, plastic cylinders, beads, or pellets of nylon, styrene-divinyl benzene copolymer, polyethylene or other plastic. The media acts upon a suspension of the clay in water.

Most preferably, the milling media is minus 20 plus 50 mesh (US sieve) styrene divinyl benzene copolymer beads. Generally the volume of beads to clay slurry varies between 20–70%, most preferably between 35% and 50%. The clay feed to the process should typically be controlled between 20% to 50% solids; however, optimum processing conditions are often achieved between 35 and 45% solids.

A suitable vessel used for the process contains vertical baffles and typically has a height to diameter ratio greater than 1.0 and optimally 1.5 to 2.0. Such a vessel is equipped with an agitation system containing multiple agitator elements attached to a vertical shaft. The number and spacing of the agitators must be optimized for the specific process conditions in order to impart the necessary combined shear and percussive and frictional energy input necessary to overcome the Van der Waals forces holding individual platelets in a stacked array. Energy input required for delamination will vary due to differences between crudes, process conditions, and equipment; typically requiring 10 to 50 horesepower-hour per ton of clay charged to the delaminators.

In continuous delamination, the clay is fed continuously into a delaminating apparatus and the discharge from the apparatus is advantageously combined with a fractionation of the clay, returning the coarser clay to the apparatus while removing only the finer clay of the desired particle size. The selective takeoff of finer clay, while returning the coarser clay to the vessel in which the delamination is taking place, has the advantage that the overall process yield can be improved and plates greater than 5 micrometers face diameter can be fractured to meet the desired particle size attributes. In this manner, the clay remaining in the apparatus during the continued operation is made up mainly of the coarser clay particles which are undergoing delamination and which are continuously freed from finer clay particles by the selective drawoff and fractionation and return of coarser clay particles.

In this continuous withdrawl of clay suspension, separation of finer clay and return of coarser clay to the apparatus is also advantageously continuous, and can be accomplished by subjecting the withdrawn clay to a centrifugal separation with return of the coarser clay to the apparatus, or by the use of one or more cyclone separators which will separate the finer clay fraction and return the coarser clay to the apparatus.

The slip of delaminated clay is then optionally centrifuged to remove oversize, e.g., particles larger than 2 micrometers, as an underflow and the overflow product which is then passed through a high intensity magnetic separator, followed by bleaching, filtration and drying to produce product of the invention. The centrifuged underflow containing oversize may be blended with appropriate levels of delaminated and/or undelaminated clay to achieve blends of desired particle size distribution and further processed in a conventional manner, e.g. magnetic purification and for bleaching, to produce other advantageous kaolin products.

The fine particle size fraction separated from the coarser kaolin in the first classification step (prior to delamination) may be processed in a conventional manner, e.g., magnetic purification and/or bleaching, to produce No. 1 or No. 2 grade coating clays.

As mentioned, it is within the scope of the invention to delaminate the degritted slip without first fractionating the slip. It is also within the scope of the invention to delaminate with grinding media other than plastic beads, e.g., by sand, zircon or glass beads or by the delamination process known as "superstrusion".

Delaminated kaolin pigments of the invention can be advantageously used as the single pigment in coating color formulations used to coat paper and paper board. However, it is also within the scope of the invention to employ pigments of the invention in blends with other kaolin and non-kaolin pigments, and to use the blends to coat paper and paperboard. Such blends may be produced prior to the preparation of coating color formulations or produced concomitant with the preparation of coating color formulations.

Delaminated pigments are particularly advantageous when used as the single pigment to coat ground wood-containing lightweight paper. A typical ground-wood containing lightweight paper basestock, suitable for coating, may have the following characteristics:

Basis weight: 24 lbs/3300 ft$^2$ or 36 g/m$^2$
Brightness: 67.5%
Opacity: 76%

In preparing coating color formulations, coating pigments are admixed in a conventional manner with other constituents and binders, materials that bind the coating pigments to the paper basestock surface. Coating color formulations will vary from mill to mill for the same end- use application, and will differ on the basis of the surface characteristics required by different printing methods commonly used. For example:

| Typical Light Weight Coated Paper - Coating Formulations | |
| --- | --- |
| Europe | |
| Offset Paper | Rotogravure Paper |
| 100 pts pigment | 100 pts pigment |
| 10 pts Dow 685 | 4.8 pts Acronal ® 548 |
| 5 pts PG280 | 0.5 pts Nopcote ® C-104 |
| 0.5 pts Nopcote ® C-104 | |
| 0.5 pts Sunrez ® 700C | |
| United States | |
| Offset Paper | Roto Gravure Paper |
| 100 pts pigment | 100 pts pigment |
| 8 pts PG280 | 7 pts PG280 |
| 8 pts CP640 A | 4 pts CP620 A |
| 0.5 pts Nopcote ® C-104 | 5 pts Nopcote ® C-104 |
| 0.5 pts Sunrez ® 700C | | pts = parts

All particle sizes used in the specification and claims are determined with the SEDIGRAPH 5100 particle size analyzer and are reported as equivalent spherical diameters (e.s.d.) on a weight percentage basis.

Light scattering and gloss were determined by coating the kaolin clay suspensions at 60% solids onto black glass plates at a coat weight of 7.0–14.0 g/m$^2$ (expressed as dry clay). The reflectance of the coatings, after drying in air, is measured at wavelengths 457 nm and 577 nm by means of an Elrepho reflectometer. The 457 nm wavelength corresponds to the wavelength used in the TAPPI brightness measurement and the 577 nm wavelength to that used to measure opacity. The reflectance values are converted by the use of Kubelka-Munk equations to light scattering values (m$^2$/Kg). The light scattering values are a measure of the opacity potential of the clay. The higher values indicate that light, rather than passing through, is reflected and scattered back. The higher the light scattering value, the higher the opacity potential of the clay. The black glass gloss value is a measure of specular gloss at 75 degrees (15 degrees from the plane of the paper), and is widely used as a particle measure of surface quality and shinny appearance (which is conventionally equated with high quality). In many applications, high gloss values are desirable.

In preparing slurries for measurement of high shear (Hercules) and low shear (Brookfield) viscosity, Engelhard Corporation procedure PL-1 was used. Brookfield viscosity was measured using TAPPI procedure T648 om-88 at 20 rpm using the #1 or #2 spindle; in some cases Brookfield viscosity was measured at 100 rpm using the #3 spindle. All slurries were formulated with optimum amount of dispersant, following the PL-3 procedure of Engelhard Corporation. Descriptions of PL-1, PL-3 and Hercules viscosity measurement procedures appear in U.S. Pat. No. 4,738,726.

In the examples which follow, references are made to pigment brightness, which were determined in the conventional manner (TAPPI standard T452 m—58) using a G.E. Brightness meter.

In Examples 1 and 2 which follow, the kaolin clay crudes were obtained from deposits of the northern portion of the Rio Capim river basin of Para, Brazil. In Example 3, the kaolin crudes were a bulk sample obtained from deposits approximately 75 kilometers due north of Manaus, Amazonas, Brazil.

EXAMPLE 1

Whole Fraction Delaminated Products

This example demonstrates the embodiment of the invention in which a degritted slip of kaolin is subjected to mechanical delamination without first fractionating the slip. (Whole fraction delamination). The kaolin slip used as feed in the process was a sample of Capim kaolin, described above. The slip was prepared by blunging kaolin crude (pH 4.4) in water containing sodium polyacrylate (C211 brand) and soda ash as a dispersant, resulting in a slurry having a pH of 8.2 The slip was degritted in two stages, the first involving allowing the slip to remain quiescent (settle) for 5 minutes and then passing the nonsettled portion through a 200 mesh screen. The degritted slip at about 39% solids contained about 86% of the starting crude. Particle size of the recovered kaolin was 54% finer than micrometers. Brightness was 81.3%; $TiO_2$ and $Fe_2O_3$ were 1.08% and o.71%, respectively.

Delamination was carried out in a pilot plant delamination simulator which consists of a stainless steel vessel nominally 10"ID by 15" high. Within the vessel are three vertical baffles approximately ½" wide extending the length of the vessel. The agitation system utilizes three ceramic cones mounted in a turban array where two or more cones can be mounted on the vertical shaft. The power for the vessel is provided by a ¾ HP drill press with variable speed control. To this vessel, approximately 2.5 gallons of clay slip are delaminated per batch utilizing the necessary bead volume ratio of styrene divinyl benzene copolymer to achieve optimum results. In this example, bead volume was 50% and residence time of the slip in the delaminator was 55 minutes. Bead size was minus 20 plus 50 mesh (US sieve), and shape was spherical.

Particle size of the delaminated product was about 70% finer than 2 micrometers. Brightness was 81.9%. $TiO_2$ and $Fe_2O_3$ analyses were 1.08 and 0.72%, respectively, indicating the kaolin was not brightened during delamination. Solids of the delaminator discharge was 19.2%.

In one case the delaminator discharge was then charged to brightness enhancing equipment, described below, resulting in a finished Product A with 70% of the kaolin particles finer than 2 micrometers. In another case, the delaminator discharge was charged to a Sharples centrifuge which divided the slip into Product B, a fine fraction of 80% finer than two micrometers (77.3% yield and 19.2% solids), and a coarse reject fraction.

For both products A and B, the delaminated kaolin was then charged to a conventional high intensity magnetic separator using various throughput rates in order to remove colored paramagnetic impurities and thereby improve brightness. Prior to magnetic treatment the brightness of the feed kaolin was 82.3%; $TiO_2$ and $Fe_2O_3$ were 1.13 and 0.70%, respectively. The pilot plant High Intensity Magnetic Separator is fitted with a 1"ID ×20" high canister containing approximately 100 pads of 430 stainless steel. Space velocity calculations are utilized to simulate equivalent processing conditions for commercial scale HIMS units. Typically, commercial scale units have canisters 84 or 120 inch diameter ×20 inch high matrix. An important consideration in plant scale up is the performance of a process under varying capacities. Thus, in order to simulate future scale up requirements space velocities are varied typically to simulate production capacities of 20 to 40 tons per hour utilizing an 84" HIMS unit. At throughput rates between 20 and 40 tons per hour, products having brightness in the range of 87.7 to 88.4% were produced. Those skilled in the art will recognize that the 5-6 points increase in brightness as a result of magnetic separation treatment was unusually high; typical Georgia kaolins experience an increase in brightness of only 1 to 3 points by treatment in conventional high intensity separators.

Brightness of all magnetically purified products were further significantly increased by floccing the slip of magnetically purified kaolin with 6#/T aluminum sulfate (4.7 pH), treatment with a conventional sodium dithionite bleach reagent, followed by filtration and viscosity measurement. Brightness results for runs at various magnet throughput rates and bleach levels are reported below in table form for the 80% finer than two micrometer product. (The 70% finer than two micrometers product responded similarly)

| Brightness of Delaminated Beneficiated Kaolin Products | | | | |
|---|---|---|---|---|
| Bleach | Magnetic Through-Put (tons/hour) | | | |
| #/T | 0 t/hr | 20 t/hr | 30 t/hr | 40 t/hr |
| 0 | 82.3 | 88.4 | 87.8 | 87.8 |
| 7 | 84.2 | 89.6 | 89.4 | 88.8 |
| 10 | 85.0 | 89.6 | 89.4 | 89.1 |
| 13 | 84.7 | 89.6 | 89.5 | 89.2 |

The characteristics of the two products A and B of this example:

| | A | B |
|---|---|---|
| Particle Size | | |
| % finer than 10 micrometers | 98 | 100 |
| % finer than 5 micrometers | 92 | 98 |
| % finer than 2 micrometers | 72 | 80 |
| % finer than 1 micrometers | 52 | 60 |
| % finer than 0.5 micrometers | 28 | 32 |
| % finer than 0.2 micrometers | 7 | 6 |
| Median Particle Size | .94 | .77 |
| Ratio: % finer than 2.0 / % finer than 0.5 = | 2.57 | 2.50 |
| Surface Area m²/g | 10.6 | 11.5 |
| Viscosity | | |
| Solids % | 67.0 | 67.0 |
| Brookfield #2 @ 20 rpm | 97 cp | 76 cp |
| @ 100 rpm | 77 cp | 71 cp |
| Hercules @ 1100 rpm | 5 dynes | 5.2 dynes |

EXAMPLE 2

Delaminated Products From Coarse Particle Size Fractions Of Crude

This example illustrates the production of a mechanically delaminated clay product of the invention from a coarse particle size fraction of crude and a byproduct No. 1 grade product.

The crude was blunged in water at 40% solids, resulting in a pH of 4.4. To facilitate subsequent processing the slurry was dispersed by adding soda ash (2 pounds per ton) and $N^R$ Brand sodium silicate solution (4 pounds per ton), resulting in a pH of 8.4.

The dispersed slurry was degritted by allowing it to settle for 5 minutes and then passing the nonsedimented portion through a 200 mesh scren (U.S. Standard) to remove grit. The size of the kaolin in the minus 200 mesh (degritted) slip was 54% by weight finger than 2 micrometers, Brightenss was 82.6%. Chemical analyses was 0.90 weight %$TiO_2$ and 0.58% $Fe_2O_3$.

The degritted slip at 32.7% solids was then divided in a Sharpless centrifuge into a fine fraction (93% finer than 2 micrometers at 20.6% solids) and a coarse fraction (22% finer than 2micrometers).

To the coarse centrifuge underflow fraction (22% finer than 2 micrometers) there was added a portion of the fines (93% finger than 2 micrometers) and a portion of degritted feed (54% finer than 2 micrometers) to produce a delaminator charge have a desired particle size of about 51% minus 2 micrometers. The blend of clays charged to the delaminator had a brightness of 82.8% and analyzed 0.90% $TiO_2$ and 0.62% $Fe_2O_3$.

The resulting blend of dispersed clays at 42.6% solids was then subjected to mechanical delamination in a pilot plant delamination simulator, described in the previous example, in a batch operation for 1/½ hours using minus 20 plus 50 mesh spherical styrene—divinyl benzene co-polymer beads; bead volume was 35% during delamination. Particle size distribution of the delaminated product was 62% by weight finer than 2 micrometers; $TiO_2$ and $Fe_2O_3$ contents were 0.86% and 0.64%. Brightness was 83.5%.

The slurry discharged from the delaminator, which had a distinctly pink appearance, was then separated in a Sharples centrifuge, recovering a delaminated fractionated product having No. 2 coating clay particle size specification (81% finer than 2 micrometers) and 84.1% brightness. $TiO_2$ was 1.24%; $Fe_2O_3$ was 0.61%. The delaminated product was then purified in a high intensity magnetic separator With a 430 stainless steel wool matrix. As a consequence of magnetic separation, the distictly pink color disappeared.

Portions of the mechanically delaminated, magnetically purified clay were then bleached with various amounts of sodium dithionite. Optimum bleach dosage was 12 pounds per ton, resulting in a bleached, delaminated product having a brightness of 90.2%. $TiO_2$ content was 0.78%; $Fe_2O_3$ was 0.56%.

The 93% finer than 2 micrometer fraction of undelaminated clay from the initial Sharpless classification (prior to delamination) was also magnetically purified, bleached and spray dried to recover a No. 1 coating clay.

The delaminated product made in the above described procedure had the following characteristics:

| Particle Size: | |
|---|---|
| % finer than 10.0 micrometers | >99 |
| % finer than 5.0 micrometers | 99 |
| % finer than 2.0 micrometers | 81 |
| % finer than 1.0 micrometers | 56 |
| % finer than 0.5 micrometers | 26 |
| % finer than 0.2 micrometers | 3 |
| Median Particle Size: | 0.88 micrometers |
| Ratio: $\frac{\% \text{ finer than 2.0 micrometers}}{\% \text{ finer than 0.5 micrometers}} = 3.1$ | |
| Surface Area: | 9.4 m²/g |
| Slurry Viscosity | |
| At 68.5% solids: | |
| Brookfield @ 20 rpm: | 80 cp |
| @ 100 rmp: | 70 cp |
| Hercules @ 1100 rpm: | 6.4 dyne-end point |
| At 71.7% solids: | |
| Brookfield @ 20 rpm: | 170 cp |
| @ 100 rpm: | 132 cp |
| Hercules: | 245 rpm @ 16 dynes |
| Black Glass | |
| Scattering co-efficient at 457 nm: | 113 m²/Kg |
| Scattering co-efficient at 577 nm: | 81 m²/Kg |
| Gloss 82.5% | |

It is within the scope of the invention to utilize feed to the delaminator which consists of coarse centrifuge underflow fraction (about 20% finer than 2 micrometers) and a portion of degritted feed (about 55% finer than two micrometers) to produce a delaminator charge of a desired particle size of about 35% minus 2 micrometers. The resulting blend of dispersed clays is then subjected to mechanical delamination under the conditions and in the manner described above. The delaminator discharge has a particle size distribution of about 60% finer than two micrometers. The slurry discharge is then charged to a Sharples centrifuge, recovering a delaminated fracitionated product stream with a particle size of about 80% finer than 2 micrometers, which is then purified as described above. The characteristics of the delaminated, fractionated product conform to the specifications of the products of the invention. This embodiment of the invention is not limited to the specific particle size variations set forth above.

EXAMPLE 3

Whole Fraction Delamination (Manaus, Amazons, Brazil kaolin crudes)

In this example, processing steps described above in Example 1 for Product A were employed for crudes from deposits of kaolinitic sands located about 75 kilometers north of the city of Manaus, Amazonas state, Brazil.

The slip Was prepared by blunging the kaolin crude in water containing Calgon ® dispersant, resulting in a slurry with a pH of 7.1. The slip was degritted in two stages, the first involving allowing the slip to remain quiescent for about 5 minutes and then passing the nonsettled portion through a 200 mesh screen (U.S. standard). The degritted slip at about 41% solids contains about 43% of the starting crude. Particle size of the recovered kaolin was 57% finer than 2 micrometers. Brightness was 82.6%, $Fe_2O_3$ and $TiO_2$ were 0.69% and 0.81% respectively.

Delamination was carried out in a pilot plant delamination simulator as described above. Bead volume was 50% and residence time was 45 minutes. The discharge of the delaminator was charged to a magnetic separator and then flocced and bleached with 6#/ton K-brite ® sodium dithionite solution, then filtered, rinsed and dried using conventional procedures.

The delaminated pigment product of this example had the following characteristics:

| | | |
|---|---|---|
| Particle Size | 99% | finer than 10 micrometers |
| Distribution | 93% | finer than 5.0 micrometers |
| (weight % finer | 71% | finer than 2.0 micrometers |
| than e.s.d.) | 49% | finer than 1.0 micrometer |
| | 27% | finer than 0.5 micrometers |
| | 3% | finer than 0.2 micrometers |
| Median particle size: | 1.02 | micrometers |
| Ratio: $\frac{\% \text{ finer than 2.0 micrometers}}{\% \text{ finer than 0.5 micrometers}} = 2.6$ | | |
| Surface Area: | 9.2 | m$^2$/g |
| Viscosity, measured at 70.3% solids | | |
| Brookfield @ 20 rpm: | 100 | cp |
| @ 100 rpm: | 80 | cp |
| Hercules @ 1100 rpm: | 7.7 | dynes |
| Black Glass | | |
| Scatter coefficient at 457 nm: | 108 | m$^2$/Kg |
| Scatter coefficient at 577 nm: | 82 | m$^2$/Kg |
| Gloss: not measured | | |

We claim:

1. A novel hydrous kaolin pigment adapted for use in coating paper adapted to be printed by gravure or offset and comprising kaolin particles which have been subjected to the process of mechanical delamination, said kaolin particles having the following characteristics:
   particle size (e.s.d. as determined by sedigraph)
   At least 95% finer than 10 micrometers
   37% or less than 0.5 micrometers
   12% or less finer than 0.2 micrometers
   median particle of size at least 0.70 micrometers
   the ratio of $$\frac{\% \text{ finer than 2.0 micrometers}}{\% \text{ finer than 0.5 micrometers}} > 2.0$$

surface area of 12.5 m$^2$/gm or less (BET method)
   viscosity
   brookfield viscosity, measured at 20 rpm and 67-68% solids: 175 cp or less
   brookfield viscosity, measured at 20 rpm and at 100 rpm at 72% solids: 300 cp or less; and
   hercules viscosity, measured at 1100 rpm and 67-68% solids: dyne endpoint
   black glass scatter
   scatter coefficient at 457 nm: $\geq$100 m$^2$/Kg
   scatter coefficient at 577 nm: $\geq$80 $^2$/Kg gloss at least 75%.

2. An aqueous slurry containing the pigment of claim 1.

3. An aqueous paper coating composition containing the kaolin pigment of claim 1 and an organic binder.

4. A paper web coated with the kaolin pigment of claim 1.

* * * * *